United States Patent [19]

Lederman et al.

[11] Patent Number: 5,748,413
[45] Date of Patent: May 5, 1998

[54] MAGNETORESISTIVE REAS TRANSDUCER WITH EXCHANGE BIASING OF MAGNETORESISTIVE SENSOR AND SOFT ADJACENT LAYER

[75] Inventors: Marcos M. Lederman; Samuel W. Yuan, both of San Francisco, Calif.

[73] Assignee: Read-Rite Corporation, Milpitas, Calif.

[21] Appl. No.: 657,999

[22] Filed: Jun. 4, 1996

[51] Int. Cl.[6] .................................................. G11B 5/30
[52] U.S. Cl. ......................................................... 360/113
[58] Field of Search ............................................. 360/113

[56] References Cited

U.S. PATENT DOCUMENTS 5,285,339  2/1994  Chen et al. ............................ 360/113

Primary Examiner—A. J. Heinz
Attorney, Agent, or Firm—Nathan N. Kallman

[57] ABSTRACT

A magnetoresistive (MR) read transducer includes an MR sensor element having end regions and a center active region. The end regions are pinned both top and bottom by an exchange coupling antiferromagnetic material. This pinning action causes the end regions to act as permanent magnets having the same remanent magnetic moment $M_r$ as that of the center active region, thereby resulting in suppression of magnetic edge effects in the transducer. A magnetic soft bias layer adjacent to the magnetoresistive sensor element also has its ends pinned by exchange coupling antiferromagnetic material.

6 Claims, 1 Drawing Sheet

MAGNETORESISTIVE REAS TRANSDUCER WITH EXCHANGE BIASING OF MAGNETORESISTIVE SENSOR AND SOFT ADJACENT LAYER

FIELD OF THE INVENTION

This invention relates to magnetic transducers for reading information signals from magnetic media and in particular to improved magnetoresistive read transducers.

DESCRIPTION OF THE PRIOR ART

Magnetoresistive (MR) sensors or heads are presently used for reading signals recorded on a magnetic surface at high linear densities. An MR sensor detects magnetic field signals through the resistance changes of a MR read element as a function of the amount and direction of magnetic flux being sensed by the element.

For an MR element to operate optimally, two bias fields should be provided. To bias the MR element so that its response to a flux field is linear, a transverse bias field is generally provided. This bias field is normal to the plane of the magnetic media and parallel to the surface of the planar MR element.

The other bias field which is usually employed with MR elements is referred to as a longitudinal bias field, which extends parallel both to the surface of the magnetic media and to the lengthwise direction of the MR element. The function of the longitudinal bias field is to suppress Barkhausen noise which originates from multi-domain activities in the MR element.

Numerous prior art biasing methods and apparatus for MR sensors have been developed which use both longitudinal and transverse bias, and these prior art biasing methods and apparatus have been generally effective to meet the prior art requirements. However, the continuing effort to increase recording density has led to the requirement for narrower recording tracks and increased linear recording density along the tracks. The small MR sensors which are necessary to meet these increasing requirements cannot always be made with prior art techniques because of competing bias requirements.

U.S. Pat. No. 5,422,571, Gurney et al. describes an MR transducer utilizing the spin valve effect and employing two ferromagnetic layers separated by a nonmagnetic metallic layer. A filter layer of nonmagnetic conductive material is deposited in contact with one of the ferromagnetic layers to form a low resistance path for conduction electrons transmitted through the adjacent filter layer. The thickness of the filter layer is such that it blocks conduction electrons having spins antiparallel to the direction of magnetization in the filter layer while allowing the flow of conduction electrons with parallel spin.

U.S. Pat. No. 5,018,037, Krounbi et al. describes an MR transducer in which a contiguous junction is formed between the end regions of an MR element and hard magnet bias layers to magnetically stabilize the central active region of the MR element.

SUMMARY OF THE INVENTION

An MR transducer assembly employs an MR element having end regions and a center active region located between these end regions. In accordance with the present invention, the end regions are magnetically pinned, both top and bottom, by an exchange coupling antiferromagnetic (AFM) material. By this pinning, the magnetic material of the MR layer acts like a permanent magnet in both of the end regions, and these end regions have the same remanent magnetic moment $M_r$ as that of the center active region. This results in a suppression of edge effects in the transducer because the end regions are pinned top and bottom by the AFM material. By the use of a partial contiguous junction, as described in the above Krounbi et al U.S. Pat. No. 5,018,037, the magnetic soft adjacent layer (SAL) underlying the MR layer is also pinned at its ends by exchange coupling with an AFM layer.

DESCRIPTION OF THE PREFERRED EMBODIMENT

Figure 1:
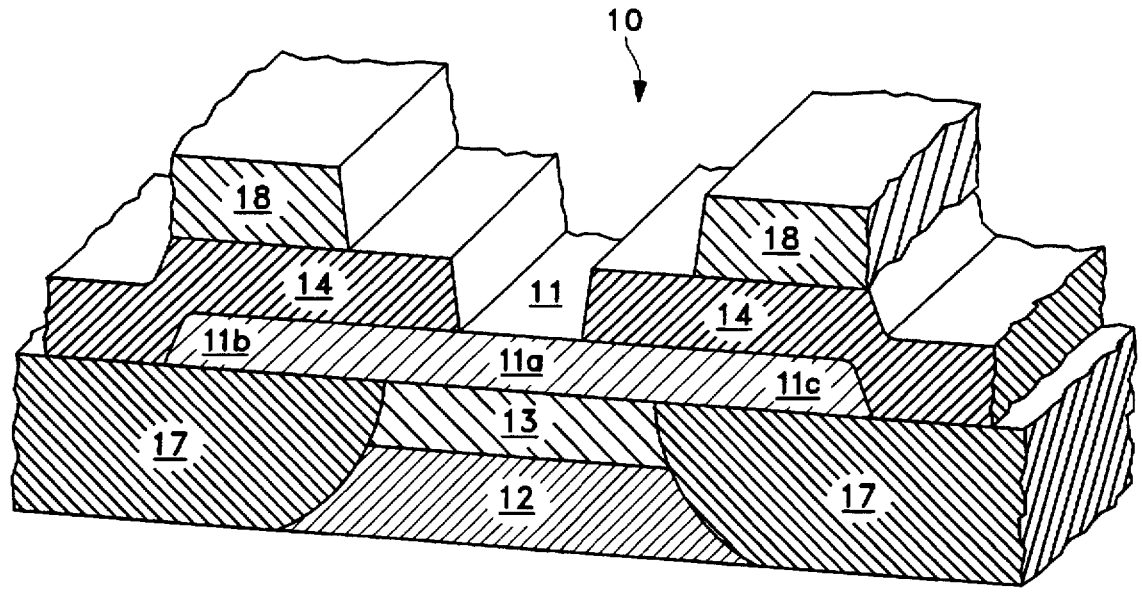
FIG. 1 is a partial isometric cross-sectional view of one embodiment of the invention.

In FIG. 1, an MR transducer assembly 10 includes an MR layer 11 of a suitable magnetic material such as NiFe. MR layer 11 has a center active region 11a and end regions 11b, 11c connected thereto but spaced therefrom. An SAL layer 12 is provided in the structure and is separated from MR layer 11 by a spacer layer 13 of a suitable material such as Ta, as is well known in the art. SAL layer 12 may be a suitable magnetic material such as a ternary alloy containing NiFe and a third element selected from Rh, Ti, Cr, Ir or Nb. SAL layer 12 provides a transverse magnetic bias to the MR layer 11 to produce a linear magnetic response in the MR layer.

In accordance with this invention, end regions 11b, 11c of MR layer 11 are covered on both the ends and tops and bottoms thereof with AFM material 14 such as FeMn, PdMn, PtMn, NiMn or other appropriate Mn-based electrically conductive material. AFM material 14 serves to pin the ends 11b, 11c of MR layer 11 by exchange coupling so that the material of layer 11 in the end regions acts as a permanent magnet, with the same $M_r$ as that of the center active region 11a. This results in a suppression of magnetic edge effects on the sensor. Electrically conductive lead members 18 are positioned on AFM material 14 to provide a current path from a current source (not shown) through electrically conductive AFM material 14 to MR layer 11.

The structure is preferably formed with contiguous junctions as shown in the above U.S. Pat. No. 5,018,037 to Krounbi et al. A layer 17 of AFM material is placed adjacent to SAL layer 12 and spacer layer 13. Because of the contiguous junction structure between SAL layer 12, spacer layer 13 and AFM material 17, the ends of SAL layer 12 are pinned by exchange coupling with AFM layer 17.

Figure 2:
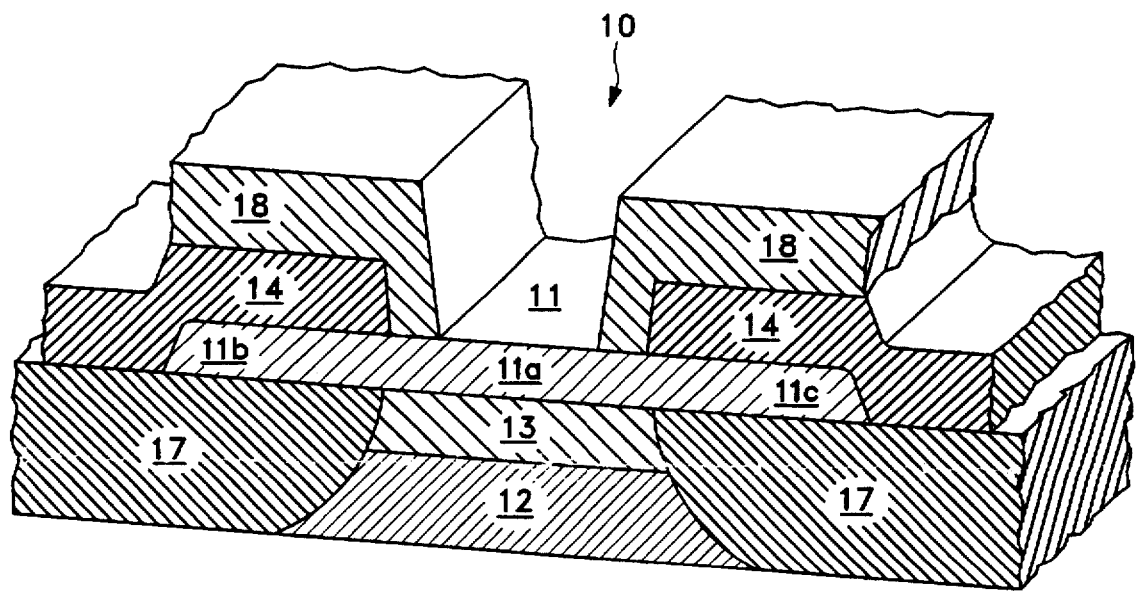
FIG. 2 is a partial isometric cross-sectional view of an alternate embodiment of the present invention.

FIG. 2 illustrates an alternate embodiment of the invention which is substantially identical to the embodiment of FIG. 1 except that in the embodiment of FIG. 2, conductive lead members 18 are in direct electrical contact with MR element 11. The embodiment of FIG. 2 would be useful in situations in which the AFM material 14, such as NiO or NiCoO, is not electrically conductive so that it is necessary to supply current directly from lead members 18 to MR element 11.

What is claimed is:

1. A magnetoresistive transducer assembly comprising:
   a layer of magnetoresistive material having a center active region and end regions spaced from said active region;
   said end regions having top surfaces, bottom surfaces and end surfaces;

a layer of antiferromagnetic material in contact with said top surfaces and said bottom surfaces of said layer of magnetoresistive material to magnetically pin said top surfaces and said bottom surfaces by magnetic exchange coupling;

a soft magnetic layer spaced from said magnetoresistive layer and having end regions; and a layer of antiferromagnetic material in contact with said end regions of said soft magnetic layer to pin said end regions of said soft magnetic layer by magnetic exchange coupling.

2. A transducer assembly in accordance with claim 1 in which said magnetoresistive material is NiFe.

3. A transducer assembly in accordance with claim 1 in which said antiferromagnetic material is FeMn, PdMn, PtMn, NiMn, IrMn, or any other Mn-based electrically conductive antiferromagnetic material.

4. A transducer assembly in accordance with claim 1 including electrically conductive lead members in electrical contact with said layer of antiferromagnetic material for supplying electrical current to said layer of magnetoresistive material.

5. A transducer assembly in accordance with claim 1 including electrically conductive lead members in electrical contact with said layer of magnetoresistive material for supplying current thereto.

6. A transducser assembly in accordance with claim 5 in which said layer of antiferromagnetic material that is in contact with said layer of magnetoresistive material is NiO, NiCoO, or any manganese-based antiferromagnetic material.

* * * * *

UNITED STATES PATENT AND TRADEMARK OFFICE
CERTIFICATE OF CORRECTION

PATENT NO. : 5,748,413
DATED : May 5, 1998
INVENTOR(S) : Lederman, et al.

It is certified that error appears in the above-identified patent and that said Letters Patent is hereby corrected as shown below:

On the title page item [54] and column 1, line 1, "REAS" should read -- READ --.

Signed and Sealed this

Twenty-eighth Day of July, 1998

Attest:

BRUCE LEHMAN

Attesting Officer          Commissioner of Patents and Trademarks